US012795376B2

(12) United States Patent
Zhou et al.

(10) Patent No.: US 12,795,376 B2
(45) Date of Patent: Nov. 10, 2026

(54) NETWORK ACCESS METHOD AND APPARATUS, AND ELECTRONIC DEVICE AND COMPUTER-READABLE STORAGE MEDIUM

(71) Applicant: ZTE CORPORATION, Shenzhen (CN)

(72) Inventors: Na Zhou, Shenzhen (CN); Xincheng Yan, Shenzhen (CN); Zhihong Jiang, Shenzhen (CN); Huiyun Teng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 302 days.

(21) Appl. No.: 18/706,212

(22) PCT Filed: Nov. 1, 2022

(86) PCT No.: PCT/CN2022/128890
§ 371 (c)(1),
(2) Date: May 23, 2024

(87) PCT Pub. No.: WO2023/072295
PCT Pub. Date: May 4, 2023

(65) Prior Publication Data
US 2025/0016570 A1 Jan. 9, 2025

(30) Foreign Application Priority Data
Nov. 1, 2021 (CN) ......................... 202111282502.4

(51) Int. Cl.
*H04W 12/71* (2021.01)
*H04W 12/06* (2021.01)
*H04W 48/08* (2009.01)

(52) U.S. Cl.
CPC ........... *H04W 12/71* (2021.01); *H04W 12/06* (2013.01); *H04W 48/08* (2013.01)

(58) Field of Classification Search
CPC ..... H04W 12/06; H04W 84/12; H04W 12/08; H04W 48/16; H04W 12/088;
(Continued)

(56) References Cited

U.S. PATENT DOCUMENTS 8,708,826 B2 * 4/2014 Robb ...................... G07F 17/32
726/4
2007/0263577 A1 * 11/2007 Gallo .................. H04W 12/041
370/338
(Continued)

FOREIGN PATENT DOCUMENTS

CN 101150406 A 3/2008
CN 101217575 A 7/2008
(Continued)

OTHER PUBLICATIONS

Mrugalski T. et al. "Dynamic Host Configuration Protocol for IPV6 (DHCPv6)," Internet Engineering Task Force, Standards Track, published on Nov. 1, 2018.
(Continued)

*Primary Examiner* — Dung Hong
(74) *Attorney, Agent, or Firm* — Li & Cai Intellectual Property (USA) Office

(57) ABSTRACT

The present disclosure provides a network access method, including: acquiring an identity identifier of a terminal; and performing inspection control on a message sent by the terminal based on the identity identifier of the terminal. The present disclosure further provides a network access apparatus, an electronic device, and a computer-readable storage medium.

12 Claims, 9 Drawing Sheets

(58) Field of Classification Search
CPC ... H04W 12/02; H04W 12/069; H04W 12/03; H04W 12/062; H04W 12/71; H04W 48/08
See application file for complete search history.

(56) References Cited

U.S. PATENT DOCUMENTS

2009/0158032 A1* 6/2009 Costa .................. H04L 63/0442 380/270
2010/0088751 A1 4/2010 Ando
2013/0097674 A1* 4/2013 Jindal ................. H04W 12/068 709/227
2015/0223041 A1* 8/2015 You ........................ H04W 12/06 455/406
2017/0118638 A1* 4/2017 Zhang ................. H04W 12/068
2018/0124597 A1* 5/2018 Malthankar ......... H04L 63/0407
2021/0037604 A1* 2/2021 Malthankar ........... H04W 76/12
2021/0306854 A1* 9/2021 Gundavelli ....... H04W 12/0471
2023/0224704 A1* 7/2023 Atarius ................. H04W 12/06 726/6

FOREIGN PATENT DOCUMENTS

CN 102026194 A 4/2011
CN 102984173 A * 3/2013
CN 103414709 A 11/2013
CN 103973658 A 8/2014
CN 106209905 A 12/2016
CN 106888091 A 6/2017
CN 110581902 A 12/2019

OTHER PUBLICATIONS

European Patent Office, the Extended European Search Report dated Sep. 16, 2025, for corresponding EP application No. 22886170.4.
WIPO, International Search Report issued on Jan. 28, 2023.

* cited by examiner

NETWORK ACCESS METHOD AND APPARATUS, AND ELECTRONIC DEVICE AND COMPUTER-READABLE STORAGE MEDIUM

CROSS REFERENCE TO RELATED APPLICATIONS

The present disclosure is a National Phase Application filed under 35 U.S.C. 371 as a national stage of PCT/CN2022/128890, filed on Nov. 1, 2022, an application claiming the priority to Chinese Patent Application No. 202111282502.4 filed on Nov. 1, 2021, the contents of which are incorporated herein by reference in their entirety.

TECHNICAL FIELD

The present disclosure relates to the field of communication network technology, and in particular, to a network access method, a network access apparatus, an electronic device, and a computer-readable storage medium.

BACKGROUND

With the continuous progress of society and the continuous development of economy, networks have become an essential part in people's daily lives. With the development of network technology, network cloudification/network ubiquity evolution and convergence of B2B (Business-to-Business) services and B2C (Business-to-Customer) services lead to a continuous increase in network open exposure surface, and "boundaries" of network security are further blurred. Meanwhile, network attack means are continuously upgraded, which further threatens network security.

The "patch type" security design mode in the related technology has problems of structural rigidity, hindsight, and lack of cooperation, and its stacked reinforced security architecture in such security design mode depends on a passive protection mode of a priori knowledge and is hard to meet requirements of new network security protection.

Therefore, the design mode needs to be changed to inject a stronger security gene in the networks, and a network security design needs to be made from aspects of identity identifier, data, and network requirements, for example, network access is based on an access terminal and it is ensured that the identity identifier of the terminal is trustable through verification on the access terminal, thereby realizing security management and traceability of the terminal.

SUMMARY

In a first aspect, an embodiment of the present disclosure provides a network access method, including: acquiring an identity identifier of a terminal; and performing inspection control on a message sent by the terminal based on the identity identifier of the terminal.

In a second aspect, an embodiment of the present disclosure provides a network access apparatus, including: an authentication module configured to acquire an identity identifier of a terminal; and a control module configured to perform inspection control on a message sent by the terminal based on the identity identifier of the terminal.

In a third aspect, an embodiment of the present disclosure provides an electronic device, including: at least one processor, a memory having stored thereon at least one computer program which, when executed by the at least one processor, causes the at least one processor to implement the aforesaid network access method; and at least one input/output (I/O) interface connected between the at least one processor and the memory and configured to enable information interaction between the at least one processor and the memory.

In a fourth aspect, an embodiment of the present disclosure provides a computer-readable storage medium having stored thereon a computer program which, when executed by a processor, implements the aforesaid network access method.

BRIEF DESCRIPTION OF DRAWINGS

In the drawings for the embodiments of the present disclosure.

DETAIL DESCRIPTION OF EMBODIMENTS

Figure 1:
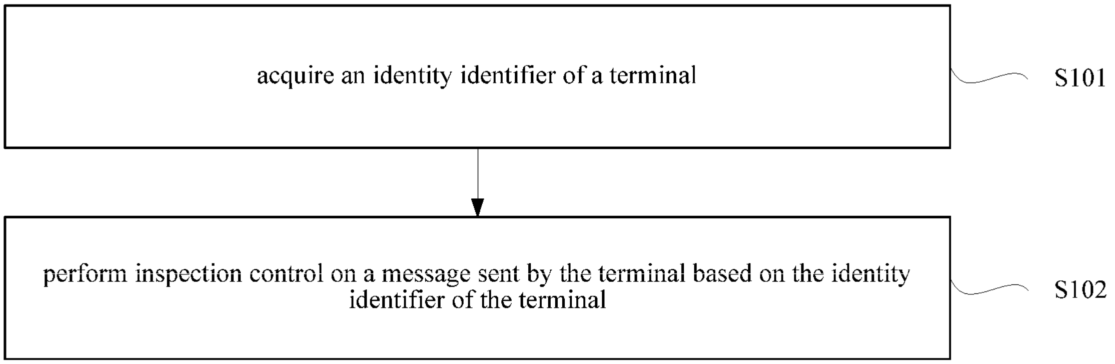
FIG. 1 is a flowchart illustrating a network access method according to an embodiment of the present disclosure.

In order to enable those of ordinary skill in the art to better understand the technical solutions of the present disclosure, a network access method and apparatus, an electronic device, and a computer-readable storage medium provided by the present disclosure are described in detail below with reference to the drawings.

The embodiments of the present disclosure will be described more fully below with reference to the drawings, but the embodiments illustrated may be embodied in different forms, and the present disclosure should not be interpreted as being limited to the embodiments described herein. The embodiments are provided to make the present disclosure more thorough and complete, and are intended to enable those of ordinary skill in the art to fully understand the scope of the present disclosure.

The drawings for the embodiments of the present disclosure are intended to provide a further understanding of the embodiments of the present disclosure and constitute a part of the specification. Together with the embodiments of the present disclosure, the drawings are used to explain the present disclosure, but do not constitute any limitation to the present disclosure. The above and other features and advantages will become more apparent to those of ordinary skill in the art from the description of specific embodiments with reference to the drawings.

The embodiments of the present disclosure can be described with reference to plans and/or cross-sectional views with the aid of idealized schematic diagrams of the present disclosure. Accordingly, the exemplary drawings may be modified according to manufacturing techniques and/or tolerances.

All the embodiments of the present disclosure and the features therein may be combined with each other if no conflict is incurred.

The terms used herein are merely used to describe specific embodiments, and are not intended to limit the present disclosure. The term "and/or" used herein includes one associated listed item or any and all combinations of more than one associated listed items. The terms "one" and "the" used herein which indicate a singular form are intended to include a plural form, unless expressly stated in the context. The terms "include" and "be made of" used herein indicate the presence of the described features, integers, operations, elements and/or components, but do not exclude the presence or addition of one or more other features, integers, operations, elements, components and/or combinations thereof.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein The embodiments of the present disclosure are not limited to those illustrated by the drawings, but include modifications to configuration formed based on a manufacturing process. Thus, regions shown in the drawings are illustrative, and shapes of the regions shown in the drawings illustrate specific shapes of regions of elements, but are not intended to make limitations.

In some related technologies, 802.1x (an access control and authentication protocol) is used as a network access method, and 802.1x as a port-based terminal access control security mechanism is widely supported and confirmed by equipment manufacturers, network operators, and end users due to its advantages of low cost, good service continuity and expandability, high security and flexibility, and good universality in all local area networks conforming to the Institute of Electrical and Electronics Engineers (IEEE) 802 standard.

802.1x takes ports as authentication granularity, and a port of a switch is opened when a legal terminal passes 802.1x authentication, so that the terminal can access a network via the port. However, since the port of the switch is always in an open state after being opened, when terminals (whether the terminals are legal terminals or illegal terminals) of other users access the network via the port, the terminals can, without authentication, access the network and access network resources, which brings potential security risks to the network.

In a first aspect, referring to FIG. 1, an embodiment of the present disclosure provides a network access method, including operations S101 and S102.

At S101, acquiring an identity identifier of a terminal.

A switch/an authentication system acquires the identity identifier of the terminal (after the terminal passes network access authentication).

A process of acquiring, by the switch/the authentication system, the identity identifier of the terminal may be specifically as follows: the terminal initiates network access authentication to the authentication system by sending an authentication request carrying the identity identifier of the terminal to the authentication system; the authentication system sends, in response to the authentication request of the terminal, an authentication message carrying the identity identifier of the terminal to an authentication server for authentication; and the authentication server performs the network access authentication on the terminal according to the identity identifier of the terminal to determine whether the terminal is legal (that is, whether the terminal is a legal terminal).

In a case where the authentication server determines that the terminal corresponding to the identity identifier passes the authentication (that is, the terminal passes the network access authentication), the authentication server sends a message about the terminal passing the network access authentication to the authentication system, and the switch/the authentication system stores the identity identifier of the terminal.

The switch/the authentication system may also acquire the identity identifier of the terminal through configuration on the switch. That is, identity identifiers of terminals passing the network access authentication are configured on the switch, and the switch/the authentication system acquires the identity identifier of the terminal by reading configuration information.

At S102, performing inspection control on a message sent by the terminal based on the identity identifier of the terminal.

With the switch storing the identity identifiers of the terminals passing the network access authentication, after receiving the message, the switch may determine whether the terminal sending the message passes the network access authentication by acquiring the identity identifier of the terminal sending the message and comparing the identity identifier with the stored identity identifiers of the terminals passing the network access authentication. If the terminal sending the message has passed the network access authentication, the switch forwards the message; and if the terminal sending the message has not passed the network access authentication, the switch rejects forwarding of the message.

It should be noted that the authentication system and the authentication server may be two independent devices deployed at a server side, or may be different components of one device deployed at the server side.

Similarly, the authentication system and the switch may be two independent devices, or may be one same device, that is, one device serves as both the switch and the authentication system. The authentication system and the switch exchange information with each other, and description of the information exchange process is omitted in the present disclosure.

In the network access method provided by the present disclosure, the switch performs inspection control on the messages sent by the terminals based on the identity identifiers of the terminals, so that the switch can filter out the messages sent by the terminals which has not passed the network access authentication (whether the terminals are legal terminals or illegal terminals), and the terminals which has not passed the network access authentication can be prevented from accessing a network through the switch, thereby improving security of the network.

Figure 2:
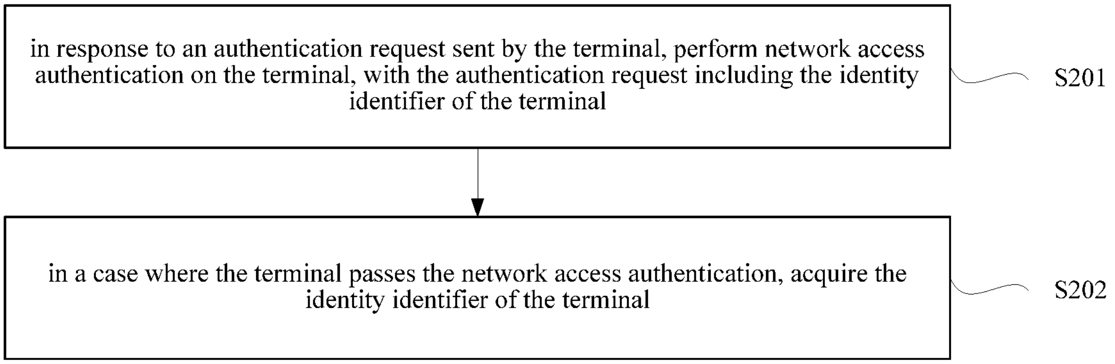
FIG. 2 is a flowchart of some operations of a network access method according to an embodiment of the present disclosure.

In some implementations, referring to FIG. 2, acquiring the identity identifier of the terminal (operation S101) includes operations S201 and S202.

At S201, performing, in response to an authentication request sent by the terminal, network access authentication on the terminal, with the authentication request including the identity identifier of the terminal.

The terminal initiates the network access authentication to the authentication system by sending the authentication request carrying the identity identifier of the terminal to the authentication system; the authentication system sends, in response to the authentication request sent by the terminal, the authentication message carrying the identity identifier of the terminal to the authentication server for authentication; and the authentication server performs the network access authentication on the terminal according to the identity identifier of the terminal to determine whether the terminal is legal (that is, whether the terminal is a legal terminal).

In addition to the identity identifier of the terminal, the authentication request sent by the terminal may further include a Media Access Control (MAC) address of the terminal. The identity identifier of the terminal is a unique identifier of the terminal in the entire network, is different from the identity identifiers of the other terminals, and does not coincide with the identity identifiers of the other terminals.

At S202, storing, in a case where the terminal passes the network access authentication, the identity identifier of the terminal.

In a case where the authentication server determines that the terminal corresponding to the identity identifier passes the authentication (that is, the terminal passes the network access authentication), the authentication server sends a message about the terminal passing the network access authentication to the authentication system, and the switch/the authentication system stores the identity identifier of the terminal.

It should be noted that the authentication system and the authentication server may be two independent devices deployed at the server side, or may be different components of one device deployed at the server side.

Similarly, the authentication system and the switch may be two independent devices, or may be one same device, that is, one device serves as both the switch and the authentication system.

In the network access method provided by the present disclosure, the authentication request sent by the terminal includes the identity identifier of the terminal, and the authentication system and the authentication server may perform the network access authentication on the terminal according to the identity identifier of the terminal, that is, the network access authentication on the terminal takes terminals as authentication granularity in the network access method provided by the present disclosure. Compared with some related technologies which take ports as the authentication granularity, the network access method provided by the present disclosure has finer authentication granularity and higher security.

In some implementations, the network access authentication is 802.1x authentication, that is, the network access authentication initiated by the terminal is the 802.1x authentication.

As a port-based terminal access control security mechanism, 802.1x is widely supported and confirmed by equipment manufacturers, network operators, and end users due to its advantages of low cost, good service continuity and expandability, high security and flexibility, and good universality in all local area networks conforming to the IEEE 802 standard.

Figure 3:
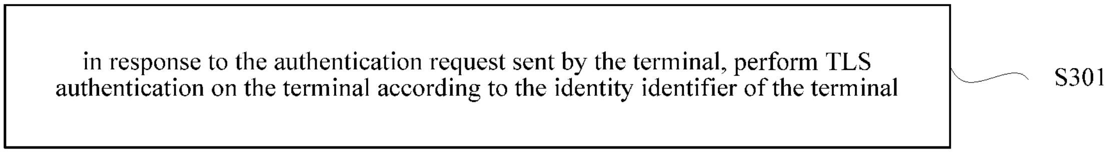
FIG. 3 is a flowchart of some operations of a network access method according to an embodiment of the present disclosure.

Referring to FIG. 3, the network access authentication is 802.1x authentication, and performing the network access authentication on the terminal in response to the authentication request sent by the terminal (operation S201) includes operation S301.

At S301, in response to the authentication request sent by the terminal, performing Transport Layer Security (TLS) authentication on the terminal according to the identity identifier of the terminal.

The terminal initiates the 802.1x authentication to the authentication system by sending the authentication request carrying the identity identifier of the terminal to the authentication system; the authentication system sends, in response to the authentication request sent by the terminal, the authentication message carrying the identity identifier of the terminal to the authentication server for authentication; and the authentication server performs the 802.1x authentication on the terminal according to the identity identifier of the terminal to determine whether the terminal is legal (that is, whether the terminal is a legal terminal).

In a process of performing, by the authentication server, the 802.1x authentication on the terminal, when receiving the identity identifier of the terminal, the authentication server may determine whether to perform the TLS authentication on the terminal according to the identity identifier of the terminal. If the authentication server determines that the terminal needs to be subjected to the TLS authentication, the authentication server performs the TLS authentication on the terminal according to the identity identifier of the terminal.

A session key agreed upon by both the terminal and the authentication server may be generated by performing the TLS authentication on the terminal, and the generated session key may be used for protection of confidentiality and integrity of the message sent by the terminal.

Figure 4:
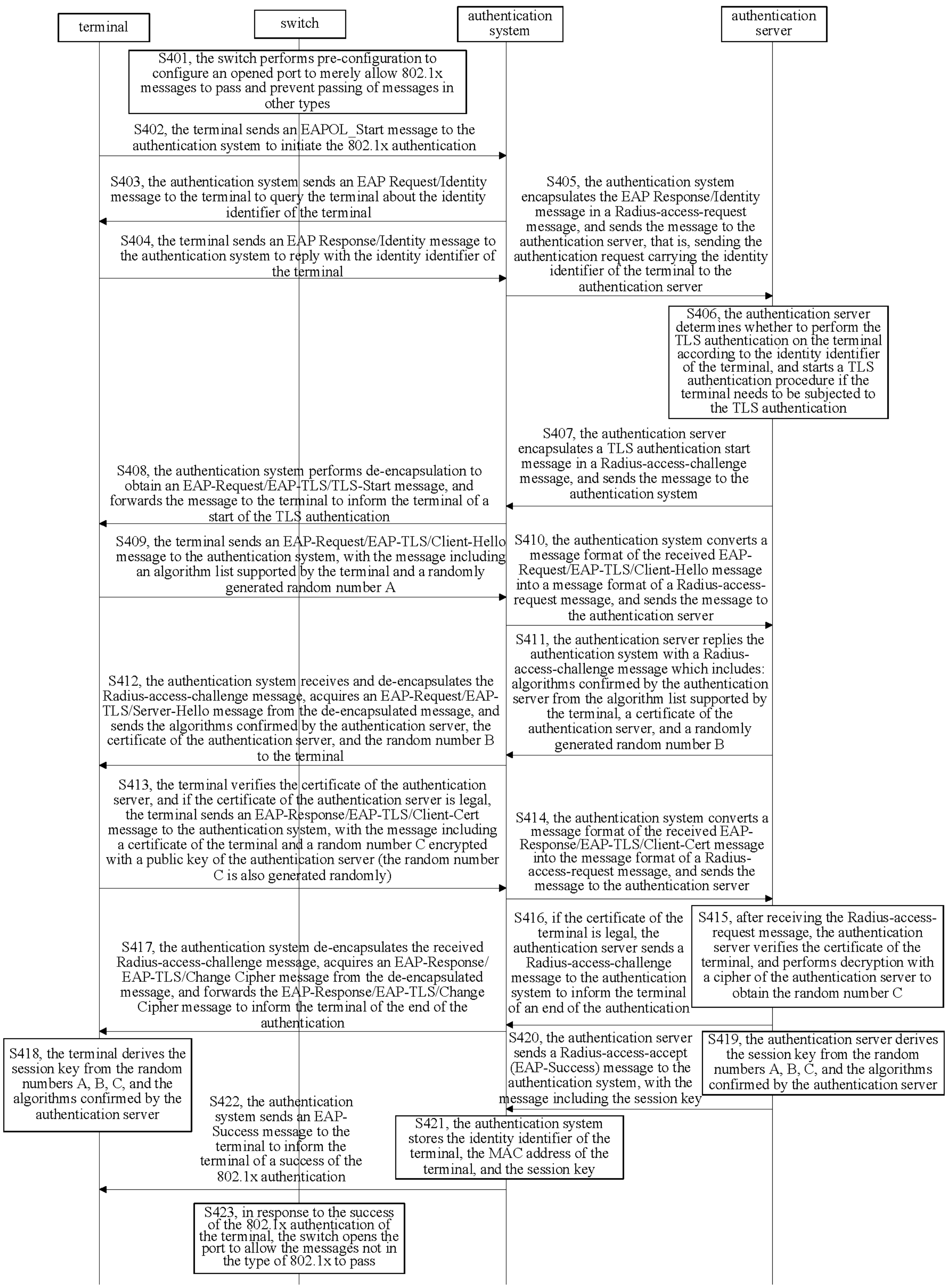
FIG. 4 is a flowchart illustrating an example of some operations of a network access method according to an embodiment of the present disclosure.

FIG. 4 is a flowchart illustrating an example of the operation of performing the 802.1x authentication on the terminal in the network access method according to an embodiment of the present disclosure. Referring to FIG. 4, performing the 802.1x authentication on the terminal may include operations S401 to S423.

At S401, the switch performs pre-configuration to configure an opened port to merely allow messages in the type of 802.1x to pass and prevent passing of messages in other types.

At S402, the terminal sends an Extensible Authentication Protocol over LAN-Start (EAPOL_Start) message to the authentication system to initiate the 802.1x authentication.

At S403, the authentication system sends an Extensible Authentication Protocol (EAP) Request/Identity message to the terminal to query the terminal about the identity identifier of the terminal.

At S404, the terminal sends an Extensible Authentication Protocol (EAP) Response/Identity message to the authentication system to reply with the identity identifier of the terminal.

At S405, the authentication system encapsulates the EAP Response/Identity message in a Remote Authentication Dial-In User Service (Radius)-access-request message, and sends the message to the authentication server, that is, sending the authentication request carrying the identity identifier of the terminal to the authentication server.

At S406, the authentication server determines whether to perform the TLS authentication on the terminal according to the identity identifier of the terminal, and starts a TLS authentication procedure if the terminal needs to be subjected to the TLS authentication.

At S407, the authentication server encapsulates a TLS authentication start message in a Remote Authentication Dial-In User Service (Radius)-access-challenge message, and sends the message to the authentication system.

At S408, the authentication system performs de-encapsulation to obtain an EAP-Request/EAP-TLS/TLS-Start message, and forwards the message to the terminal to inform the terminal of a start of the TLS authentication.

At S409, the terminal sends an EAP-Request/EAP-TLS/Client-Hello message to the authentication system, with the message including an algorithm list supported by the terminal and a randomly generated random number A.

At S410, the authentication system converts a message format of the received EAP-Request/EAP-TLS/Client-Hello message into a message format of a Radius-access-request message, and sends the message to the authentication server.

At S411, the authentication server replies the authentication system with a Radius-access-challenge message which includes: algorithms confirmed by the authentication server from the algorithm list supported by the terminal, a certificate of the authentication server, and a randomly generated random number B.

At S412, the authentication system receives and de-encapsulates the Radius-access-challenge message, acquires an EAP-Request/EAP-TLS/Server-Hello message from the de-encapsulated message, and sends the algorithms confirmed by the authentication server, the certificate of the authentication server, and the random number B, which are included in the message, to the terminal.

At S413, the terminal verifies the certificate of the authentication server, and if the certificate of the authentication server is legal, the terminal sends an EAP-Response/EAP-TLS/Client-Cert message to the authentication system, with the message including a certificate of the terminal and a random number C encrypted with a public key of the authentication server (the random number C is also generated randomly).

At S414, the authentication system converts a message format of the received EAP-Response/EAP-TLS/Client-Cert message into the message format of a Radius-access-request message, and sends the message to the authentication server.

At S415, after receiving the Radius-access-request message, the authentication server verifies the certificate of the terminal, and performs decryption with a cipher of the authentication server to obtain the random number C.

At S416, if the certificate of the terminal is legal, the authentication server sends a Radius-access-challenge message to the authentication system to inform the terminal of an end of the authentication.

At S417, the authentication system de-encapsulates the received Radius-access-challenge message, acquires an EAP-Response/EAP-TLS/Change Cipher message from the de-encapsulated message, and forwards the EAP-Response/EAP-TLS/Change Cipher message to inform the terminal of the end of the authentication.

At S418, the terminal derives the session key from the random numbers A, B, C, and the algorithms confirmed by the authentication server.

At S419, the authentication server derives the session key from the random numbers A, B, C, and the algorithms confirmed by the authentication server.

At S420, the authentication server sends a Radius-access-accept (EAP-Success) message to the authentication system, with the message including the session key.

At S421, the authentication system stores the identity identifier of the terminal, the MAC address of the terminal, and the session key.

At S422, the authentication system sends an EAP-Success message to the terminal to inform the terminal of a success of the 802.1x authentication.

At S423, in response to the success of the 802.1x authentication of the terminal, the switch opens the port to allow the messages not in the type of 802.1x to pass.

In some implementations, the terminal may send the MAC address to the authentication server through the authentication system in the above authentication procedure.

Figure 5:
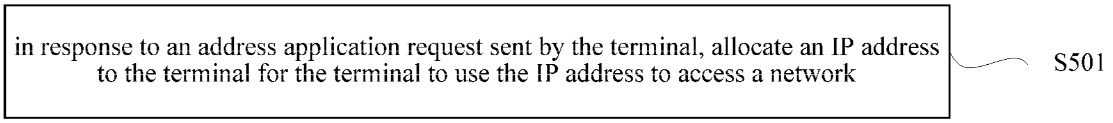
FIG. 5 is a flowchart of some operations of a network access method according to an embodiment of the present disclosure.

In some implementations, referring to FIG. 5, between storing, in the case where the terminal passes the network access authentication, the identity identifier of the terminal (operation S202) and performing inspection control on the message sent by the terminal based on the identity identifier of the terminal (operation S102), the network access method further includes operation S501.

At S501, allocating, in response to an address application request sent by the terminal, an Internet Protocol (IP) address to the terminal for the terminal to use the IP address to access a network.

In a case where the authentication server determines that the terminal passes the authentication, the switch opens the port, the terminal can send the address application request to a network device (such as a DHCP server) via the port, the DHCP server allocates the IP address to the terminal after receiving the address application request sent by the terminal, and the terminal uses the IP address to access the network.

Figure 6:
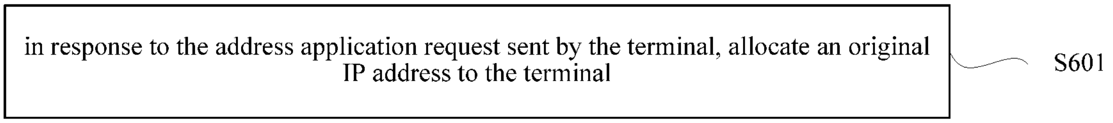
FIG. 6 is a flowchart of some operations of a network access method according to an embodiment of the present disclosure.

In some implementations, referring to FIG. 6, allocating, in response to the address application request sent by the terminal, the IP address to the terminal for the terminal to use the IP address to access the network (operation S501) includes operations S601 and S602.

At S601, allocating, in response to the address application request sent by the terminal, an original IP address to the terminal.

In the case where the authentication server determines that the terminal passes the authentication, the switch opens a new port, the terminal can send the address application request to the DHCP server via the new port, and the DHCP server allocates the original IP address to the terminal after receiving the address application request sent by the terminal.

At S602, placing the identity identifier of the terminal in the original IP address to generate a complete IP address, and allocating the complete IP address to the terminal.

The DHCP server acquires the identity identifier of the terminal, places the identity identifier of the terminal in the generated original IP address to generate the complete IP address, and allocates the complete IP address to the terminal for the terminal to use the complete IP address to access the network.

The DHCP server may place the identity identifier of the terminal at a tail end of the original IP address, that is, generating the complete IP address by taking the original IP address as a prefix of the complete IP address and the identity identifier of the terminal as a tail end of the complete IP address. Thus, after receiving the message sent by the terminal, the switch may obtain the identity identifier of the terminal by acquiring the tail end of the complete IP address.

Certainly, the identity identifier of the terminal may be placed at another position in the original IP address or a network layer, but it should be ensured that the complete IP address formed by placing the identity identifier of the terminal in the original IP address conforms to a formation rule of the IP address and the switch can recognize the identity identifier of the terminal from the complete IP address. In a case where the identity identifier of the terminal is placed at another position of a network layer of the message, the switch may recognize the identity identifier of the terminal from the network layer.

Since the terminal uses the complete IP address to access the network, the switch may acquire the identity identifier of the terminal according to the complete IP address used by the terminal after receiving the message, and further determine authenticity of the identity of the terminal and determine whether the terminal passes the network access authentication according to the identity identifier of the terminal.

In some technologies taking ports as the authentication granularity, a port of the switch is opened when a legal terminal passes the network access authentication, and is always in an open state after being opened, and when terminals (whether the terminals are legal terminals or illegal terminals) of other users access a network via the port, the terminals can, without authentication, access the network and access network resources. Compared with those technologies, the network access method provided by the present disclosure takes terminals as the authentication granularity, the identity identifier of the terminal is placed in the IP address allocated to the terminal, so that the switch can acquire, after receiving the message, the identity identifier of the terminal according to the IP address of the terminal sending the message, and further determine the authenticity of the identity of the terminal and determine whether the terminal passes the network access authentication according to the identity identifier of the terminal. Thus, when the terminals (whether the terminals are legal terminals or illegal terminals) of the other users access the network via the port, the switch can determine that those terminals have not passed the network access authentication, and further prevent the terminals from accessing the network or the network resources, which improves the security of the network.

Figure 7:
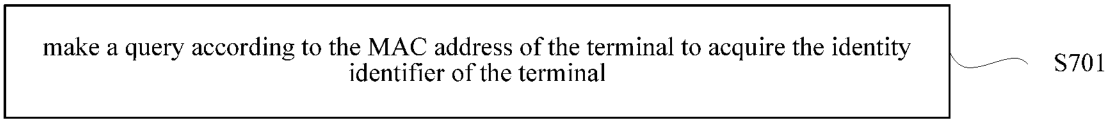
FIG. 7 is a flowchart of some operations of a network access method according to an embodiment of the present disclosure.

In some implementations, the address application request sent by the terminal includes the MAC address of the terminal. Referring to FIG. 7, in a case where the address application request sent by the terminal includes the MAC address of the terminal, before placing the identity identifier of the terminal in the original IP address (operation S602), the network access method further includes operation S701.

At S701, making a query according to the MAC address of the terminal to acquire the identity identifier of the terminal.

When the authentication system and the authentication server perform the network access authentication on the terminal, the authentication system and the authentication server may further store the MAC address of the terminal in addition to the identity identifier of the terminal. In a case where the authentication system and the authentication server store the MAC address of the terminal, the DHCP server generates the original IP address for the terminal after receiving the address application request sent by the terminal, and may query the authentication system or the authentication server according to the MAC address in the address application request to acquire the identity identifier of the terminal; and after acquiring the identity identifier of the terminal, the DHCP server places the identity identifier of the terminal in the generated original IP address to generate the complete IP address, and allocates the complete IP address to the terminal for the terminal to use the complete IP address to access the network. That is, the DHCP server may allocate the complete IP address to the terminal by sending the complete IP address to the terminal, or the DHCP server may allocate the complete IP address to the terminal in such a way that the terminal generates the complete IP address or constructs a message containing the identity identifier of the terminal with a method agreed upon with the DHCP server.

Figure 8:
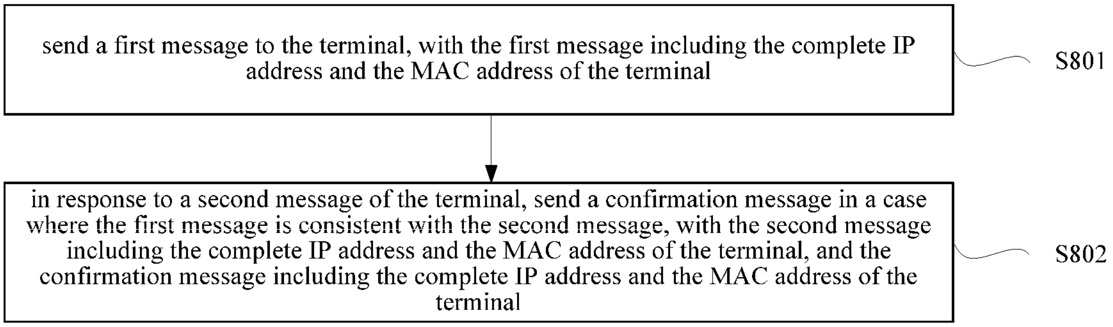
FIG. 8 is a flowchart of some operations of a network access method according to an embodiment of the present disclosure.

Furthermore, in some implementations, referring to FIG. 8, allocating the complete IP address to the terminal at operation S602 may include operations S801 and S802.

At S801, sending a first message to the terminal, with the first message including the complete IP address and the MAC address of the terminal.

At S802, sending, in response to a second message of the terminal, a confirmation message in a case where the first message is consistent with the second message, with the second message including the complete IP address and the MAC address of the terminal, and the confirmation message including the complete IP address and the MAC address of the terminal.

After generating the complete IP address, the DHCP server sends the first message (e.g., a DHCP offer message) to the terminal, and the first message includes the complete IP address and the MAC address of the terminal.

After receiving the first message, the terminal broadcasts the second message (e.g., a formal request message of DHCP request), and the second message includes the complete IP address received by the terminal and the MAC address of the terminal.

The DHCP server receives the second message, determines whether the complete IP address and the MAC address of the terminal, which are included in the second message, are consistent with the complete IP address generated by the DHCP server and the MAC address of the terminal recorded in the DHCP server (i.e., the complete IP address and the MAC address of the terminal which are included in the first message). If the complete IP address and the MAC address of the terminal, which are included in the second message, are consistent with the complete IP address generated by the DHCP server and the MAC address of the terminal recorded in the DHCP server, it is indicated that the complete IP address received by the terminal is the correct complete IP address, so that the DHCP server sends the confirmation message to confirm that the complete IP address received by the terminal is correct, and the terminal can use the IP address to access the network.

Figure 9:
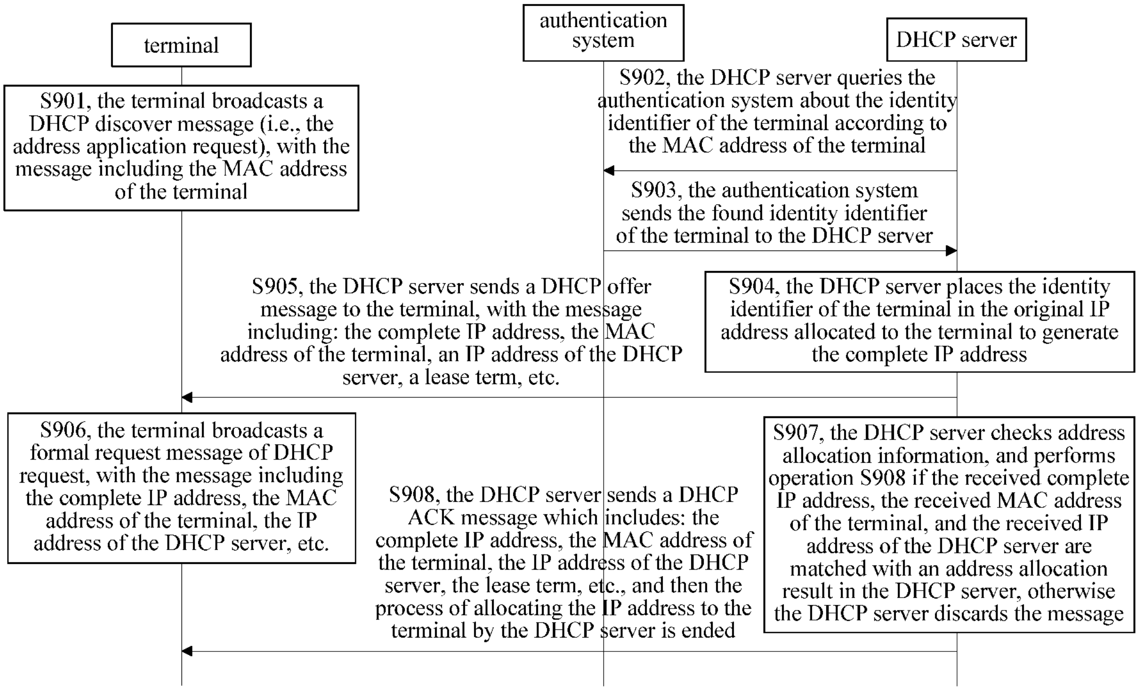
FIG. 9 is a flowchart illustrating an example of some operations of a network access method according to an embodiment of the present disclosure.

FIG. 9 is a flowchart illustrating an example of allocating, in response to the address application request sent by the terminal, the IP address to the terminal for the terminal to use the IP address to access the network (operation S501) in a case where the address application request sent by the terminal includes the MAC address of the terminal in the network access method provided by the present disclosure. Referring to FIG. 9, allocating, in response to the address application request sent by the terminal, the IP address to the terminal for the terminal to use the IP address to access the network may include operations S901 to S908.

At S901, the terminal broadcasts a DHCP discover message (i.e., the address application request), with the message including the MAC address of the terminal.

In a case of IPv6, the DHCP discover message needs to be replaced with a DHCPv6 solicit message.

At S902, the DHCP server queries the authentication system about the identity identifier of the terminal according to the MAC address of the terminal.

At S903, the authentication system sends the found identity identifier of the terminal to the DHCP server.

At S904, the DHCP server places the identity identifier of the terminal in the original IP address allocated to the terminal to generate the complete IP address.

At S905, the DHCP server sends a DHCP offer message to the terminal, with the message including: the complete IP address, the MAC address of the terminal, an IP address of the DHCP server, a lease term, etc.

In the case of IPv6, the DHCP offer message needs to be replaced with a DHCPv6 Advertise message.

At S906, the terminal broadcasts a formal request message of DHCP request, with the message including the complete IP address, the MAC address of the terminal, the IP address of the DHCP server, etc.

At S907, the DHCP server checks address allocation information, and performs operation S908 if the received complete IP address, the received MAC address of the terminal, and the received IP address of the DHCP server are matched with an address allocation result in the DHCP server, or discards the message if the received complete IP address, the received MAC address of the terminal, and the received IP address of the DHCP server are not matched with the address allocation result in the DHCP server.

At S908, the DHCP server sends a DHCP ACK message which includes: the complete IP address, the MAC address of the terminal, the IP address of the DHCP server, the lease term, etc., and then the process of allocating the IP address to the terminal by the DHCP server is ended.

In the case of IPv6, the DHCP ACK message needs to be replaced with a DHCPv6 reply message.

Certainly, the DHCP server may send the original IP address, which is allocated to the terminal, to the terminal. After the DHCP server determines that the original IP address received by the terminal is correct, the DHCP server acquires the identity identifier of the terminal according to the MAC address of the terminal, and places the identity identifier of the terminal in the original IP address to generate the complete IP address.

Figure 10:
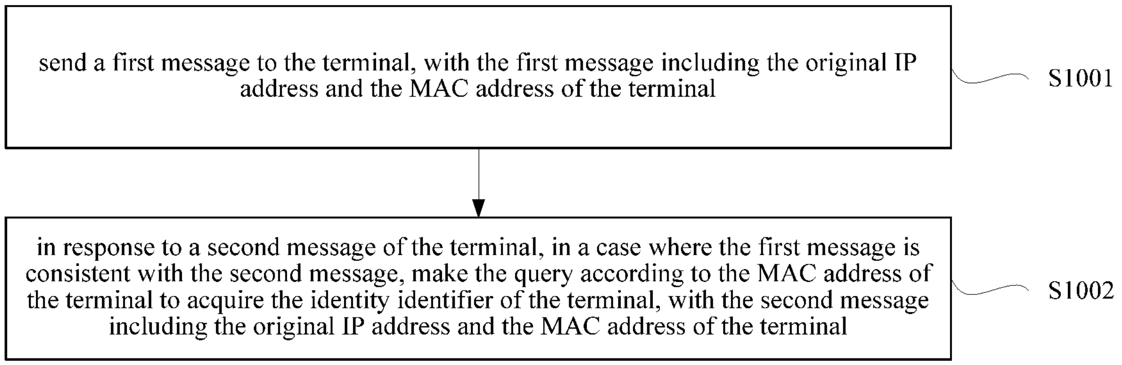
FIG. 10 is a flowchart of some operations of a network access method according to an embodiment of the present disclosure.

That is, in some implementations, referring to FIG. 10, making the query according to the MAC address of the terminal to acquire the identity identifier of the terminal (operation S701) may include operations S1001 and S1002.

At S1001, sending a first message to the terminal, with the first message including the original IP address and the MAC address of the terminal.

At S1002, in response to a second message of the terminal, in a case where the first message is consistent with the second message, making the query according to the MAC address of the terminal to acquire the identity identifier of the terminal, with the second message including the original IP address and the MAC address of the terminal.

After allocating the original IP address to the terminal, the DHCP server sends the first message (e.g., a DHCP offer message) to the terminal, and the first message includes the original IP address and the MAC address of the terminal.

After receiving the first message, the terminal broadcasts the second message (e.g., a formal request message of DHCP request), and the second message includes the original IP address received by the terminal and the MAC address of the terminal.

The DHCP server receives the second message, determines whether the original IP address and the MAC address of the terminal, which are included in the second message, are consistent with the original IP address generated by the DHCP server and the MAC address of the terminal recorded in the DHCP server (i.e., the original IP address and the MAC address of the terminal which are included in the first message). If the original IP address and the MAC address of the terminal, which are included in the second message, are consistent with the original IP address generated by the DHCP server and the MAC address of the terminal recorded in the DHCP server, it is indicated that the original IP address received by the terminal is the correct original IP address, so that the DHCP server makes the query according to the MAC address of the terminal to acquire the identity identifier of the terminal, and sends the confirmation message, which includes the complete IP address, to confirm that the original IP address received by the terminal is correct, and the terminal can use the complete IP address to access the network.

Figure 11:
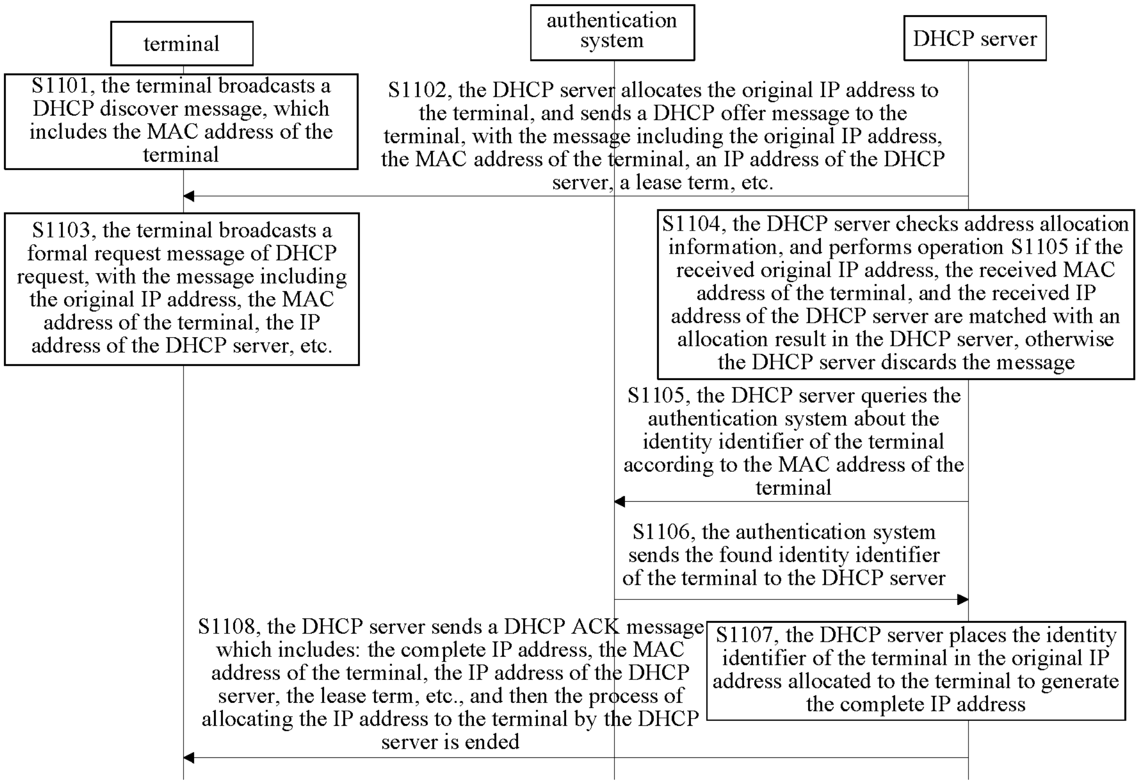
FIG. 11 is a flowchart illustrating an example of some operations of a network access method according to an embodiment of the present disclosure.

FIG. 11 is a flowchart illustrating an example of allocating, in response to the address application request sent by the terminal, the IP address to the terminal for the terminal to use the IP address to access the network (operation S501) in a case where the address application request sent by the terminal includes the MAC address of the terminal and the original IP address is sent to the terminal in the network access method provided by the present disclosure. Referring to FIG. 11, allocating, in response to the address application request sent by the terminal, the IP address to the terminal for the terminal to use the IP address to access the network may include operations S1101 to S1108.

At S1101, the terminal broadcasts a DHCP discover message, which includes the MAC address of the terminal.

In the case of IPv6, the DHCP discover message needs to be replaced with a DHCPv6 solicit message.

At S1102, the DHCP server allocates the original IP address to the terminal, and sends a DHCP offer message to the terminal, with the message including the original IP address, the MAC address of the terminal, an IP address of the DHCP server, a lease term, etc.

In the case of IPv6, the DHCP offer message needs to be replaced with a DHCPv6 Advertise message.

At S1103, the terminal broadcasts a formal request message of DHCP request, with the message including the original IP address, the MAC address of the terminal, the IP address of the DHCP server, etc.

At S1104, the DHCP server checks address allocation information, and performs operation S1105 if the received original IP address, the received MAC address of the terminal, and the received IP address of the DHCP server are matched with an address allocation result in the DHCP server, or discards the message if the received original IP address, the received MAC address of the terminal, and the received IP address of the DHCP server are not matched with the address allocation result in the DHCP server.

At S1105, the DHCP server queries the authentication system about the identity identifier of the terminal according to the MAC address of the terminal.

At S1106, the authentication system sends the found identity identifier of the terminal to the DHCP server.

At S1107, the DHCP server places the identity identifier of the terminal in the original IP address allocated to the terminal to generate the complete IP address.

The DHCP server may place the identity identifier of the terminal after the original IP address, that is, generating the complete IP address by taking the original IP address as a prefix of the complete IP address.

At S1108, the DHCP server sends a DHCP ACK message which includes: the complete IP address, the MAC address of the terminal, the IP address of the DHCP server, the lease term, etc., and then the process of allocating the IP address to the terminal by the DHCP server is ended.

In the case of IPv6, the DHCP ACK message needs to be replaced with a DHCPv6 reply message.

Figure 12:
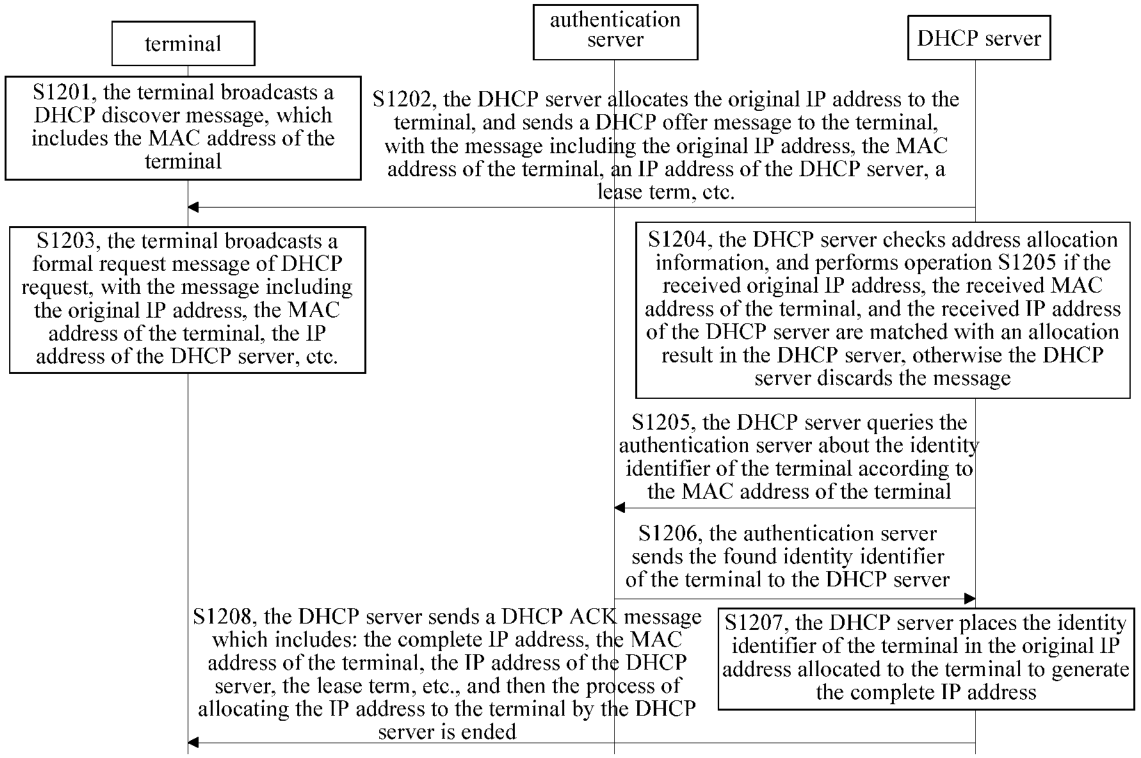
FIG. 12 is a flowchart illustrating an example of some operations of a network access method according to an embodiment of the present disclosure.

FIG. 12 is a flowchart illustrating an example of allocating, in response to the address application request sent by the terminal, the IP address to the terminal for the terminal to use the IP address to access the network (operation S501) in the case where the address application request sent by the terminal includes the MAC address of the terminal and the original IP address is sent to the terminal in the network access method provided by the present disclosure. Referring to FIG. 12, allocating, in response to the address application request sent by the terminal, the IP address to the terminal for the terminal to use the IP address to access the network may include operations S1201 to S1208.

At S1201, the terminal broadcasts a DHCP discover message, which includes the MAC address of the terminal.

In the case of IPv6, the DHCP discover message needs to be replaced with a DHCPv6 solicit message.

At S1202, the DHCP server allocates the original IP address to the terminal, and sends a DHCP offer message to the terminal, with the message including the original IP address, the MAC address of the terminal, an IP address of the DHCP server, a lease term, etc.

In the case of IPv6, the DHCP offer message needs to be replaced with a DHCPv6 Advertise message.

At S1203, the terminal broadcasts a formal request message of DHCP request, with the message including the original IP address, the MAC address of the terminal, the IP address of the DHCP server, etc.

At S1204, the DHCP server checks address allocation information, and performs operation S1205 if the received original IP address, the received MAC address of the terminal, and the received IP address of the DHCP server are matched with an address allocation result in the DHCP server, or discards the message if the received original IP address, the received MAC address of the terminal, and the received IP address of the DHCP server are not matched with the address allocation result in the DHCP server.

At S1205, the DHCP server queries the authentication server about the identity identifier of the terminal according to the MAC address of the terminal.

This operation may be performed after the DHCP discover message is received (that is, between operation S1201 and operation S1202) or after the message of DHCP request is received (that is, operation 1204 and operation S1205 are not necessarily performed in sequence).

Unlike the example illustrated by FIG. 11, the DHCP server queries the authentication server about the identity identifier of the terminal in this example. In the authentication process of the terminal, the authentication system certainly stores a corresponding relationship between the MAC address of the terminal and the identity identifier of the terminal, while the authentication server does not necessarily store the corresponding relationship between the MAC address of the terminal and the identity identifier of the terminal. In a case where the authentication server stores the corresponding relationship between the MAC address of the terminal and the identity identifier of the terminal, the authentication server may be queried about the identity identifier of the terminal.

At S1206, the authentication server sends the found identity identifier of the terminal to the DHCP server.

At S1207, the DHCP server places the identity identifier of the terminal in the original IP address allocated to the terminal to generate the complete IP address.

At S1208, the DHCP server sends a DHCP ACK message which includes: the complete IP address, the MAC address of the terminal, the IP address of the DHCP server, the lease term, etc., and then the process of allocating the IP address to the terminal by the DHCP server is ended.

In the case of IPv6, the DHCP ACK message needs to be replaced with a DHCPv6 reply message.

In some implementations, although the address application request sent by the terminal merely includes the MAC address of the terminal, after receiving the address application request sent by the terminal, the authentication system actively makes a query according to the MAC address of the terminal to acquire the identity identifier of the terminal, places the identity identifier of the terminal in the address application request, and sends the address application request having the identity identifier of the terminal placed therein to the DHCP server, so that the DHCP server may acquire the MAC address of the terminal and the identity identifier of the terminal at the same time.

Figure 13:
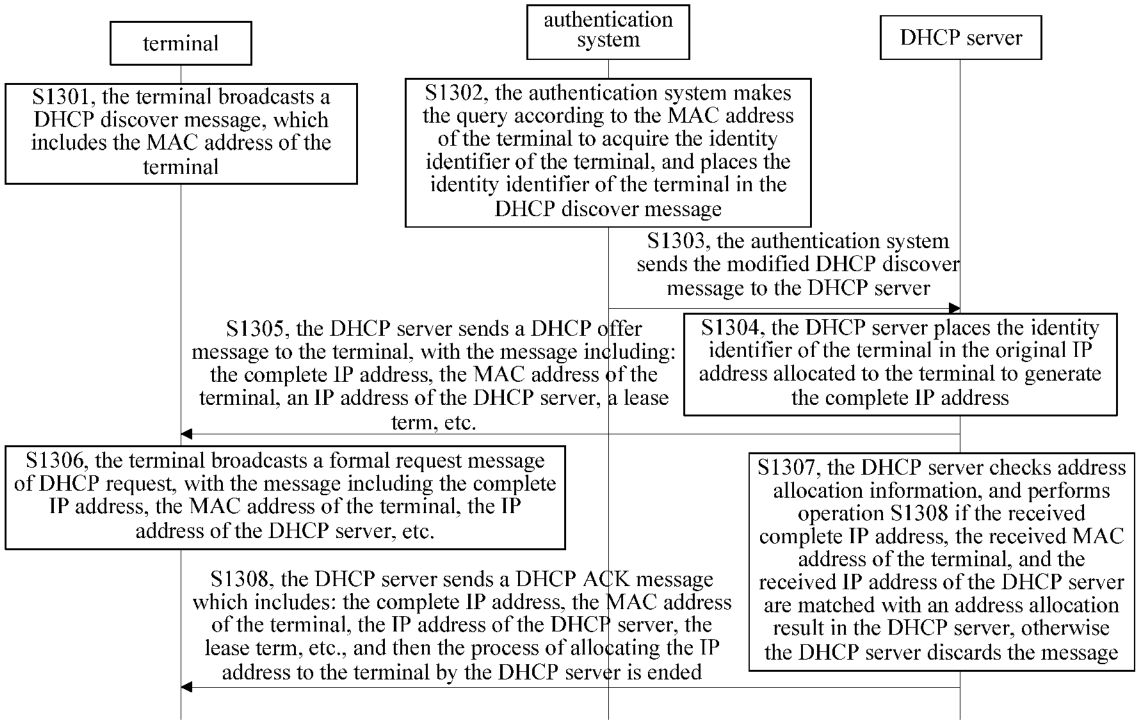
FIG. 13 is a flowchart illustrating an example of some operations of a network access method according to an embodiment of the present disclosure.

FIG. 13 is a flowchart illustrating an example of allocating, in response to the address application request sent by the terminal, the IP address to the terminal for the terminal to use the IP address to access the network (operation S501) in a case where the authentication system actively makes a query according to the MAC address of the terminal in the address application request to acquire the identity identifier of the terminal in the network access method provided by the present disclosure. Referring to FIG. 13, allocating, in response to the address application request sent by the terminal, the IP address to the terminal for the terminal to use the IP address to access the network may include operations S1301 to S1308.

At S1301, the terminal broadcasts a DHCP discover message, which includes the MAC address of the terminal.

In the case of IPv6, the DHCP discover message needs to be replaced with a DHCPv6 solicit message.

At S1302, the authentication system makes the query according to the MAC address of the terminal to acquire the identity identifier of the terminal, and places the identity identifier of the terminal in the DHCP discover message.

At S1303, the authentication system sends the modified DHCP discover message to the DHCP server.

At S1304, the DHCP server places the identity identifier of the terminal in the original IP address allocated to the terminal to generate the complete IP address.

At S1305, the DHCP server sends a DHCP offer message to the terminal, with the message including: the complete IP address, the MAC address of the terminal, an IP address of the DHCP server, a lease term, etc.

In the case of IPv6, the DHCP offer message needs to be replaced with a DHCPv6 Advertise message.

At S1306, the terminal broadcasts a formal request message of DHCP request, with the message including the complete IP address, the MAC address of the terminal, the IP address of the DHCP server, etc.

At S1307, the DHCP server checks address allocation information, and performs operation S1308 if the received complete IP address, the received MAC address of the terminal, and the received IP address of the DHCP server are matched with an address allocation result in the DHCP server, or discards the message if the received complete IP address, the received MAC address of the terminal, and the received IP address of the DHCP server are not matched with the address allocation result in the DHCP server.

At S1308, the DHCP server sends a DHCP ACK message which includes: the complete IP address, the MAC address of the terminal, the IP address of the DHCP server, the lease term, etc., and then the process of allocating the IP address to the terminal by the DHCP server is ended.

In the case of IPv6, the DHCP ACK message needs to be replaced with a DHCPv6 reply message.

Unlike the other examples, in this example, the identity identifier of the terminal is sent by the authentication system to the DHCP server, and the DHCP server constructs the complete IP address based on the identity identifier of the terminal.

Figure 14:
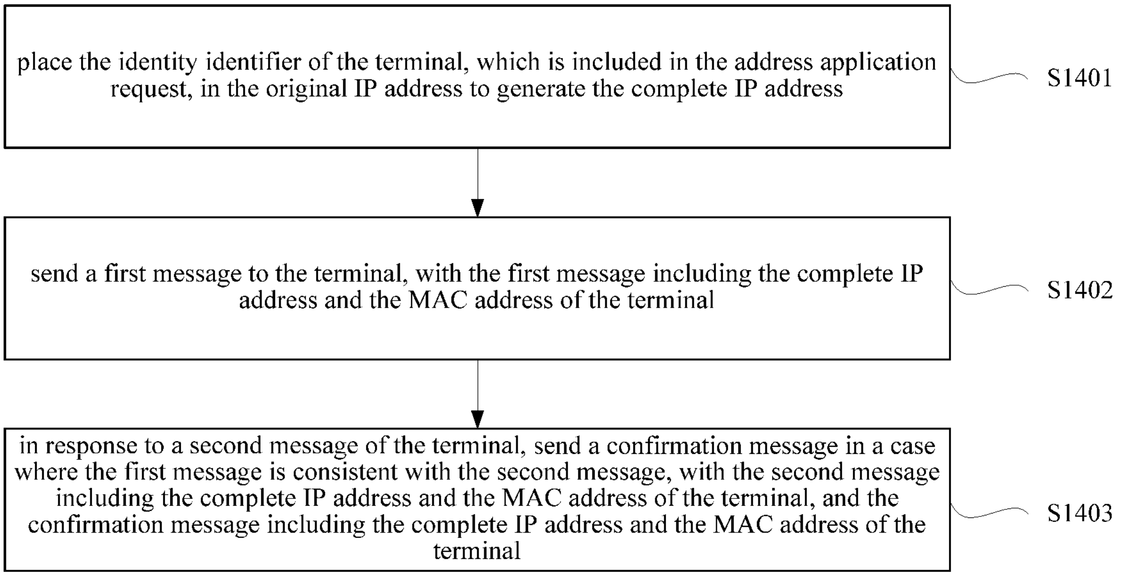
FIG. 14 is a flowchart of some operations of a network access method according to an embodiment of the present disclosure.

In some implementations, the address application request sent by the terminal includes the identity identifier of the terminal. Referring to FIG. 14, in a case where the address application request sent by the terminal includes the MAC address of the terminal and the identity identifier of the terminal, placing the identity identifier of the terminal in the original IP address to generate the complete IP address and allocating the complete IP address to the terminal (operation S602) includes operations S1401 to S1403.

At S1401, placing the identity identifier of the terminal, which is included in the address application request, in the original IP address to generate the complete IP address.

At S1402, sending a first message to the terminal, with the first message including the complete IP address and the MAC address of the terminal.

At S1403, sending, in response to a second message of the terminal, a confirmation message in a case where the first message is consistent with the second message, with the second message including the complete IP address and the MAC address of the terminal, and the confirmation message including the complete IP address and the MAC address of the terminal.

The DHCP server acquires the identity identifier of the terminal from the address application request, places the identity identifier of the terminal in the generated original IP address to generate the complete IP address, and sends the first message (e.g., a DHCP offer message) to the terminal after generating the complete IP address, and the first message includes the complete IP address and the MAC address of the terminal.

After receiving the first message, the terminal broadcasts the second message (e.g., a formal request message of DHCP request), and the second message includes the complete IP address received by the terminal and the MAC address of the terminal.

The DHCP server receives the second message, determines whether the complete IP address and the MAC address of the terminal, which are included in the second message, are consistent with the complete IP address generated by the DHCP server and the MAC address of the terminal recorded in the DHCP server (i.e., the complete IP address and the MAC address of the terminal which are included in the first message). If the complete IP address and the MAC address of the terminal, which are included in the second message, are consistent with the complete IP address generated by the DHCP server and the MAC address of the terminal recorded in the DHCP server, it is indicated that the complete IP address received by the terminal is the correct complete IP address, so that the DHCP server sends the confirmation message to confirm that the complete IP address received by the terminal is correct, and the terminal can use the IP address to access the network.

Figure 15:
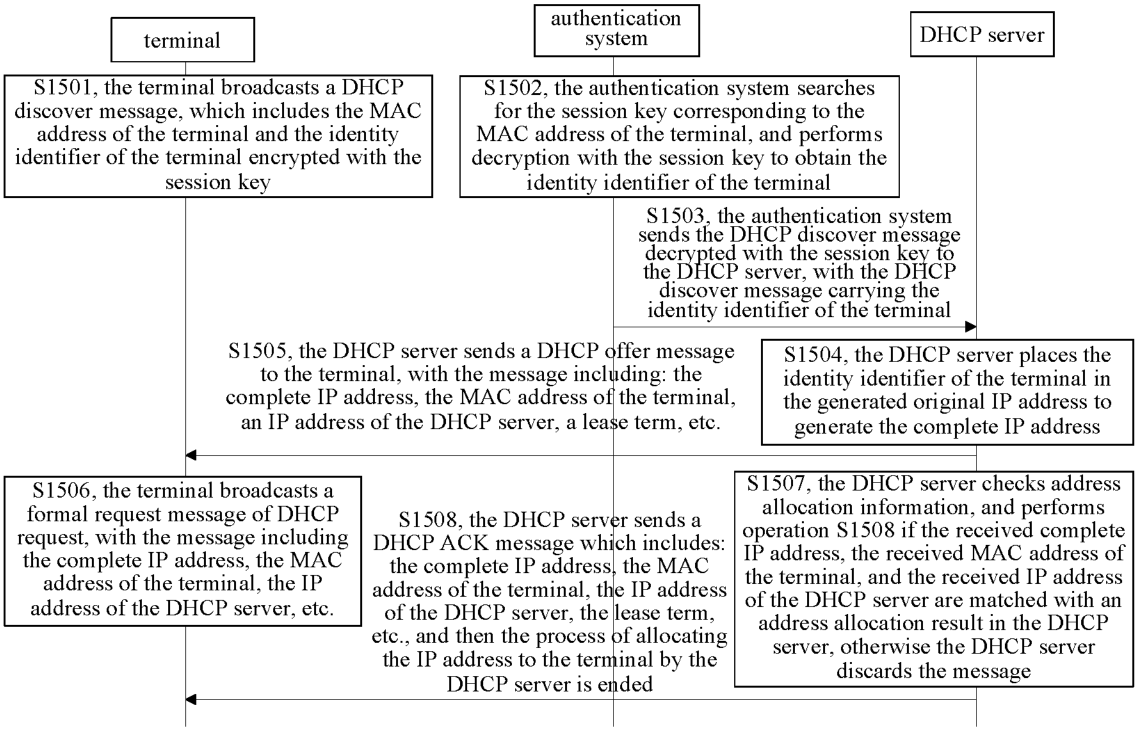
FIG. 15 is a flowchart illustrating an example of some operations of a network access method according to an embodiment of the present disclosure.

FIG. 15 is a flowchart illustrating an example of allocating, in response to the address application request sent by the terminal, the IP address to the terminal for the terminal to use the IP address to access the network (operation S501) in the network access method provided by the present disclosure. Referring to FIG. 15, allocating, in response to the address application request sent by the terminal, the IP address to the terminal for the terminal to use the IP address to access the network may include operations S1501 to S1508.

At S1501, the terminal broadcasts a DHCP discover message, which includes the MAC address of the terminal and the identity identifier of the terminal encrypted with the session key.

The DHCP discover message is a message broadcast by the terminal, so a plurality of devices in the network can receive the DHCP discover message sent by the terminal.

With the identity identifier of the terminal encrypted with the session key, even if other devices in the network receive the DHCP discover message, those devices cannot acquire the identity identifier of the terminal due to a lack of the session key, thereby improving the security.

In the case of IPv6, the DHCP discover message needs to be replaced with a DHCPv6 solicit message.

At S1502, the authentication system searches for the session key corresponding to the MAC address of the terminal, and performs decryption with the session key to obtain the identity identifier of the terminal.

At S1503, the authentication system sends the DHCP discover message decrypted with the session key to the DHCP server, with the DHCP discover message carrying the identity identifier of the terminal.

At S1504, the DHCP server places the identity identifier of the terminal in the generated original IP address to generate the complete IP address.

At S1505, the DHCP server sends a DHCP offer message to the terminal, with the message including: the complete IP address, the MAC address of the terminal, an IP address of the DHCP server, a lease term, etc.

In the case of IPv6, the DHCP offer message needs to be replaced with a DHCPv6 Advertise message.

At S1506, the terminal broadcasts a formal request message of DHCP request, with the message including the complete IP address, the MAC address of the terminal, the IP address of the DHCP server, etc.

At S1507, the DHCP server checks address allocation information, and performs operation S1508 if the received complete IP address, the received MAC address of the terminal, and the received IP address of the DHCP server are matched with an address allocation result in the DHCP server, or discards the message if the received complete IP address, the received MAC address of the terminal, and the received IP address of the DHCP server are not matched with the address allocation result in the DHCP server.

At S1508, the DHCP server sends a DHCP ACK message which includes: the complete IP address, the MAC address of the terminal, the IP address of the DHCP server, the lease term, etc., and then the process of allocating the IP address to the terminal by the DHCP server is ended.

In the case of IPv6, the DHCP ACK message needs to be replaced with a DHCPv6 reply message.

Figure 16:
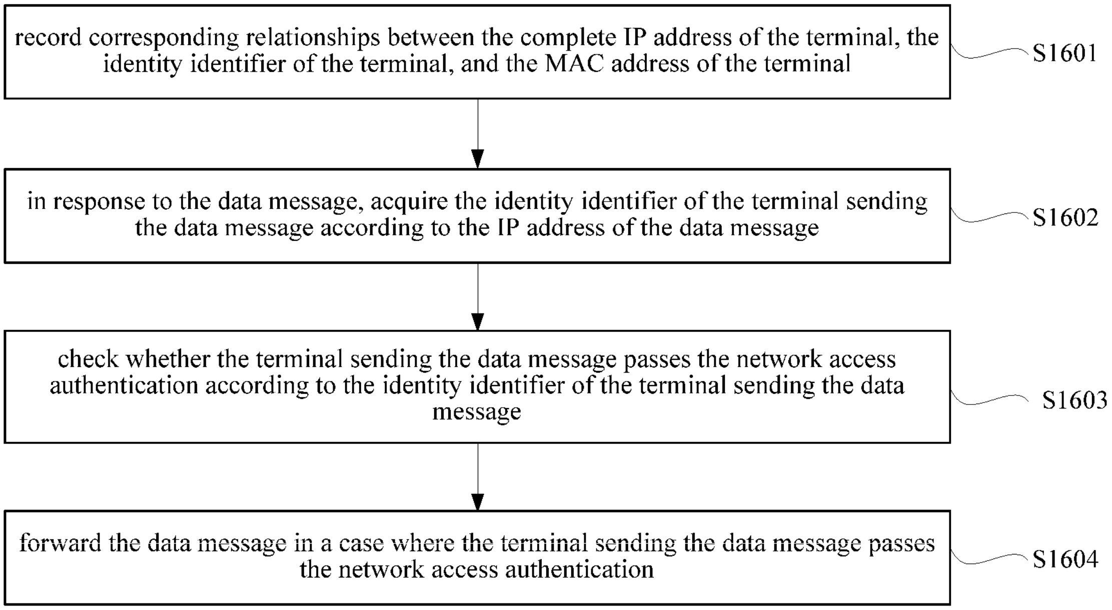
FIG. 16 is a flowchart of some operations of a network access method according to an embodiment of the present disclosure.

In some implementations, referring to FIG. 16, after allocating the complete IP address to the terminal (operation S602), the network access method further includes operation S1601.

At S1601, recording corresponding relationships between the complete IP address of the terminal, the identity identifier of the terminal, and the MAC address of the terminal.

A network device (e.g., the switch) records the identity identifier of the terminal, the complete IP address, the MAC address of the terminal, and a switch port number corresponding to the terminal, and corresponding relationships between the identity identifier of the terminal, the complete IP address, the MAC address of the terminal, and the switch port number corresponding to the terminal. In a case where the IP address of the terminal contains the identity identifier of the terminal, the identity identifier of the terminal does not need to be recorded additionally.

The terminal accesses the network with the complete IP address. After receiving a data message, the switch performs inspection control on the message based on the identity identifier of the terminal. Referring to FIG. 16, performing inspection control on the message sent by the terminal based on the identity identifier of the terminal includes operations S1602 to S1604.

At S1602, acquiring, in response to receiving the data message, the identity identifier of the terminal sending the data message.

At S1603, checking whether the terminal sending the data message passes the network access authentication according to the identity identifier of the terminal sending the data message.

At S1604, forwarding the data message in a case where the terminal sending the data message passes the network access authentication.

After receiving the data message, the switch acquires the identity identifier of the terminal sending the data message according to the IP address of the data message, and checks, according to the identity identifier of the terminal sending the data message, whether the terminal sending the data message is matched with a record in the switch, that is, whether the terminal sending the data message passes the network access authentication.

In some implementations, the authenticity of the identity of the terminal sending the data message is determined according to the acquired identity identifier of the terminal, and whether the terminal passes the network access authentication, whether a switch port corresponding to the terminal is consistent with a port allocated to the terminal by the switch, whether the IP address allocated to the terminal is consistent with an IP address used by the terminal are also determined according to the acquired identity identifier of the terminal. The terminal is allowed to access the network via the port and access the network sources merely if the authenticity of the identity of the terminal is determined, the terminal passes the network access authentication, and the switch port corresponding to the terminal is consistent with the port allocated to the terminal by the switch.

Certainly, in a case where the IP address of the terminal contains the identity identifier of the terminal and the switch records the identity identifier of the terminal, the complete IP address, the MAC address of the terminal, the switch port number corresponding to the terminal, and the corresponding relationships between the identity identifier of the terminal, the complete IP address, the MAC address of the terminal, and the switch port number corresponding to the terminal, the switch may determine whether the terminal passes the network access authentication and whether the switch port corresponding to the terminal is consistent with the port allocated to the terminal by the switch merely by determining whether the IP address of the terminal, the MAC address of the terminal, and the switch port number of the switch port accessed by the terminal are consistent with the records in the switch.

In some implementations, the address application request sent by the terminal includes the MAC address of the terminal and/or the identity identifier of the terminal.

Figure 17:
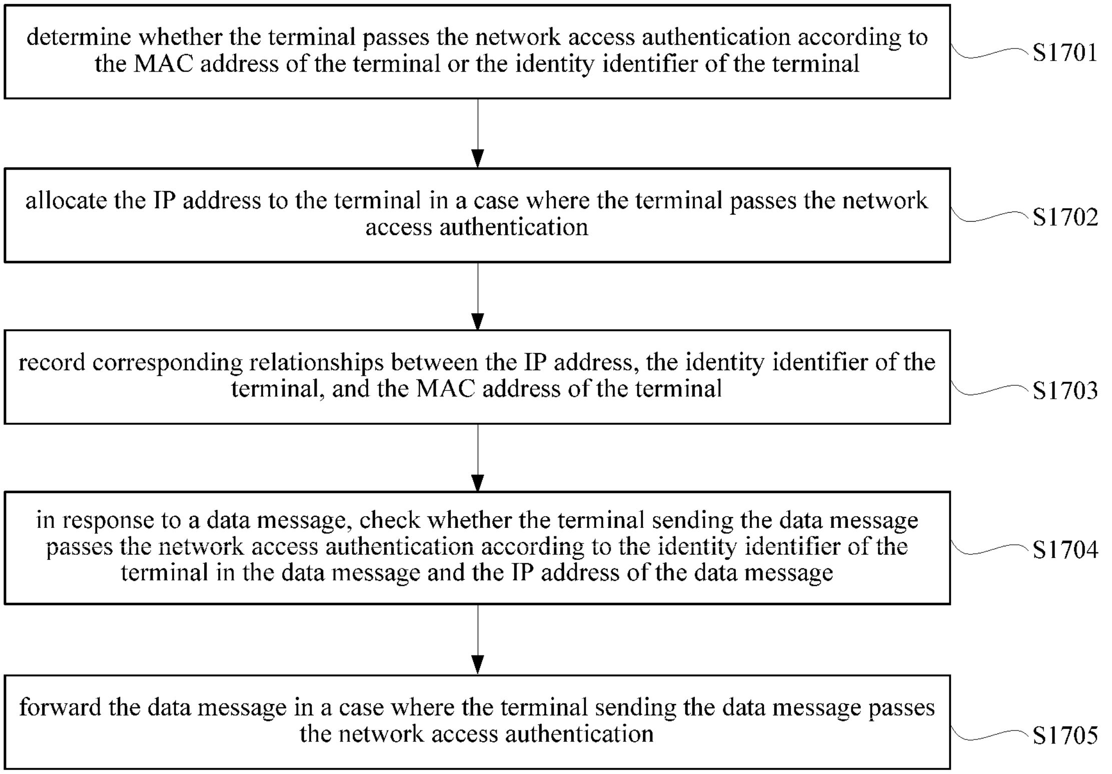
FIG. 17 is a flowchart of some operations of a network access method according to an embodiment of the present disclosure.

Referring to FIG. 17, in a case where the address application request sent by the terminal includes the MAC address of the terminal and/or the identity identifier of the terminal, allocating, in response to the address application request sent by the terminal, the IP address to the terminal (operation S501) includes operations S1701 and S1702.

At S1701, determining whether the terminal passes the network access authentication according to the MAC address of the terminal or the identity identifier of the terminal.

At S1702, allocating the IP address to the terminal in a case where the terminal passes the network access authentication.

After the switch receives the address application request sent by the terminal, in a case where the address application request includes the MAC address of the terminal, the switch determines whether the terminal passes the network access authentication according to the MAC address of the terminal in the address application request; in a case where the address application request includes the identity identifier of the terminal, the switch determines whether the terminal passes the network access authentication according to the identity identifier of the terminal; and in a case where the address application request includes the identity identifier of the terminal and the MAC address of the terminal, the switch may determine whether the terminal passes the network access authentication according to the identity identifier of the terminal in the address application request, or the switch may also determine whether the terminal passes the network access authentication according to the MAC address of the terminal in the address application request.

In a case where the switch determines that the terminal passes the network access authentication, the switch forwards the address application request to the DHCP server, the DHCP server allocates the IP address to the terminal, and the terminal uses the IP address to access the network.

Furthermore, referring to FIG. 17, after operation S1702, the network access method further includes operations S1703 to S1705.

At S1703, recording corresponding relationships between the IP address, the identity identifier of the terminal, and the MAC address of the terminal.

A network device (e.g., the switch) records the identity identifier of the terminal, the IP address allocated to the terminal by the DHCP server, the MAC address of the terminal, and the corresponding relationships between the identity identifier of the terminal, the IP address allocated to the terminal by the DHCP server, and the MAC address of the terminal.

At S1704, checking, in response to receiving a data message, whether the terminal sending the data message passes the network access authentication according to the identity identifier of the terminal in the data message and the IP address of the data message.

At S1705, forwarding the data message in a case where the terminal sending the data message passes the network access authentication.

When the terminal sends the message, the terminal may place the identity identifier of the terminal in the IP address of the terminal. After the switch receives the data message, the switch performs inspection control on the message based on the identity identifier of the terminal, the IP address of the terminal, the MAC address of the terminal, and the switch port number of the switch port accessed by the terminal.

The switch acquires the identity identifier of the terminal sending the data message according to the IP address of the data message, and checks, according to the identity identifier of the terminal sending the data message, whether the terminal sending the data message is matched with the record in the switch, that is, whether the terminal sending the data message passes the network access authentication.

The authenticity of the identity of the terminal sending the data message is determined according to the acquired identity identifier of the terminal, and whether the terminal passes the network access authentication, and whether a switch port corresponding to the terminal is consistent with a port allocated to the terminal by the switch are also determined according to the acquired identity identifier of the terminal. The terminal is allowed to access the network via the port and access the network sources merely if the authenticity of the identity of the terminal is determined, the terminal passes the network access authentication, and the switch port corresponding to the terminal is consistent with the port allocated to the terminal by the switch.

The terminal may also place the identity identifier of the terminal in the message (e.g., at a reserved bit in a message header of the message). After receiving the data message, the switch performs inspection control on the message based on the identity identifier of the terminal, the IP address of the terminal, the MAC address of the terminal, and the switch port number of the switch port accessed by the terminal. The switch decapsulates the data message to obtain the identity identifier of the terminal sending the data message, and further determines, according to the obtained identity identifier of the terminal, the authenticity of the identity of the terminal sending the data message, and determines whether the terminal passes the network access authentication, whether the switch port corresponding to the terminal is consistent with the port allocated to the terminal by the switch, whether the IP address allocated to the terminal is consistent with an IP address used by the terminal. The switch forwards the data message merely if the authenticity of the identity of the terminal is determined, the terminal passes the network access authentication, and the switch port corresponding to the terminal is consistent with the port allocated to the terminal by the switch, so as to allow the terminal to access the network via the port and access the network sources.

Certainly, in a case where the IP address of the terminal contains the identity identifier of the terminal and the switch records the identity identifier of the terminal, the complete IP address, the MAC address of the terminal, the switch port number corresponding to the terminal, and the corresponding relationships between the identity identifier of the terminal, the complete IP address, the MAC address of the terminal, and the switch port number corresponding to the terminal, the switch may determine whether the terminal passes the network access authentication and whether the switch port corresponding to the terminal is consistent with the port allocated to the terminal by the switch merely by determining whether the IP address of the terminal, the MAC address of the terminal, and the switch port number of the switch port accessed by the terminal are consistent with the records in the switch.

Figure 18:
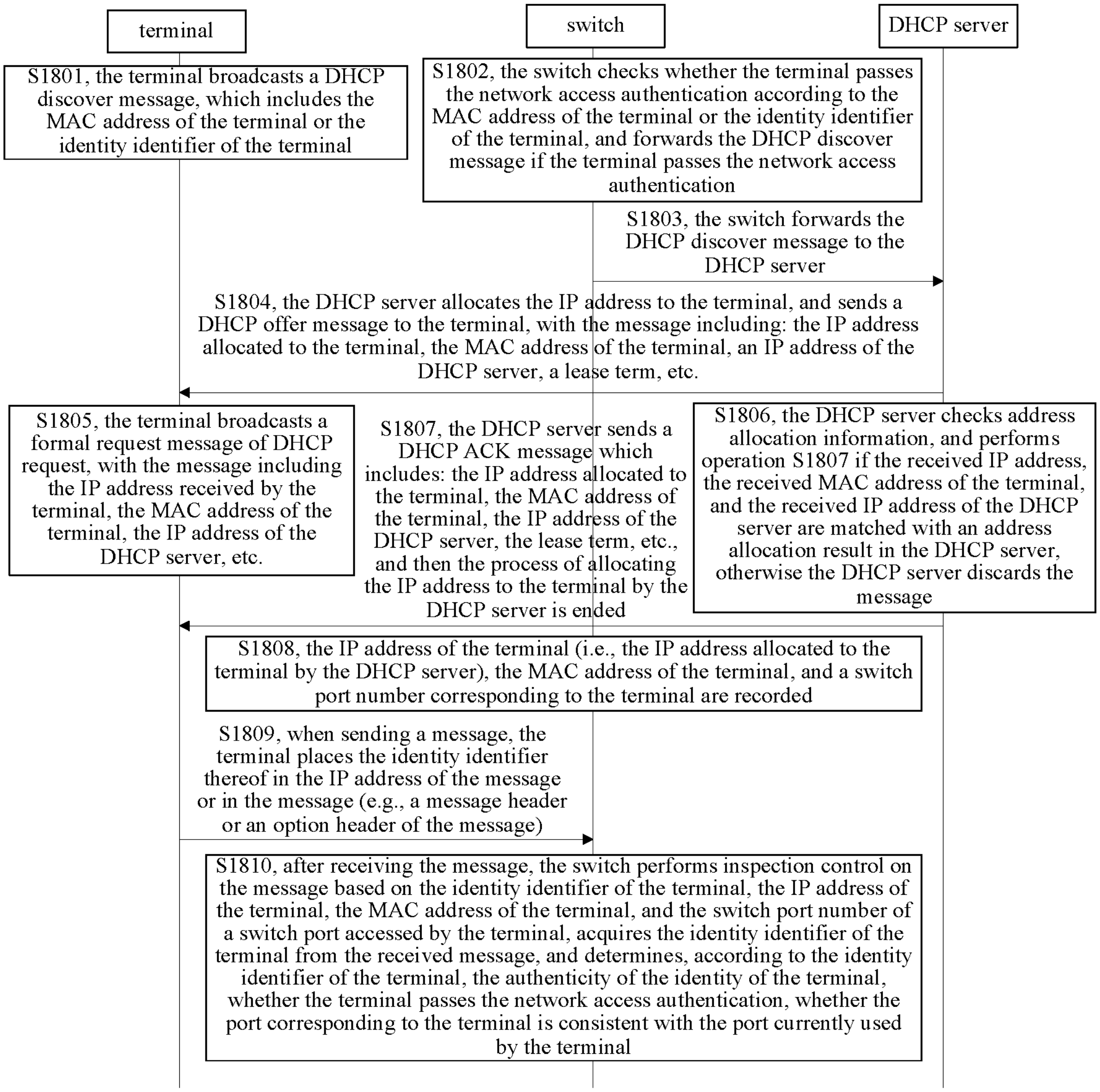
FIG. 18 is a flowchart illustrating an example of some operations of a network access method according to an embodiment of the present disclosure.

FIG. 18 is a flowchart illustrating an example of allocating, in response to the address application request sent by the terminal, the IP address to the terminal (operation S501) in a case where the address application request sent by the terminal includes the MAC address of the terminal or the identity identifier of the terminal in the network access method provided by the present disclosure. Referring to FIG. 18, allocating, in response to the address application request sent by the terminal, the IP address to the terminal may include operations S1801 to S1810.

At S1801, the terminal broadcasts a DHCP discover message, which includes the MAC address of the terminal or the identity identifier of the terminal.

In the case of IPv6, the DHCP discover message needs to be replaced with a DHCPv6 solicit message.

At S1802, the switch checks whether the terminal passes the network access authentication according to the MAC address of the terminal or the identity identifier of the terminal, and forwards the DHCP discover message if the terminal passes the network access authentication.

In this example, the switch is used to check, according to the MAC address of the terminal, whether the terminal is matched with the recorded information, that is, whether the terminal passes the network access authentication. Since the terminal accesses the network through the switch, the switch can be used to check whether the terminal passes the network access authentication, so that a process of the terminal accessing the network may be completed through information exchange among the terminal, the DHCP server, and the switch without participation of other network devices (e.g., the authentication system). Thus, on the one hand, cost can be reduced; and on the other hand, the security can be improved.

Certainly, if the address application request sent by the terminal includes the identity identifier of the terminal, the switch may determine whether the terminal passes the network access authentication according to the identity identifier of the terminal after receiving the address application request sent by the terminal.

At S1803, the switch forwards the DHCP discover message to the DHCP server.

At S1804, the DHCP server allocates the IP address to the terminal, and sends a DHCP offer message to the terminal, with the message including: the IP address allocated to the terminal, the MAC address of the terminal, an IP address of the DHCP server, a lease term, etc.

In the case of IPv6, the DHCP offer message needs to be replaced with a DHCPv6 Advertise message.

At S1805, the terminal broadcasts a formal request message of DHCP request, with the message including the IP address received by the terminal, the MAC address of the terminal, the IP address of the DHCP server, etc.

At S1806, the DHCP server checks address allocation information, and performs operation S1807 if the received IP address, the received MAC address of the terminal, and the received IP address of the DHCP server are matched with an address allocation result in the DHCP server, or discards the message if the received IP address, the received MAC address of the terminal, and the received IP address of the DHCP server are not matched with the address allocation result in the DHCP server.

At S1807, the DHCP server sends a DHCP ACK message which includes: the IP address allocated to the terminal, the MAC address of the terminal, the IP address of the DHCP server, the lease term, etc., and then the process of allocating the IP address to the terminal by the DHCP server is ended.

The IP address may be simply an address prefix.

In the case of IPv6, the DHCP ACK message needs to be replaced with a DHCPv6 reply message.

At S1808, the IP address of the terminal (i.e., the IP address allocated to the terminal by the DHCP server), the MAC address of the terminal, and a switch port number corresponding to the terminal are recorded.

At S1809, when sending a message, the terminal places the identity identifier thereof in the IP address of the message or in the message (e.g., a message header or an option header of the message).

That is, the terminal generates the complete IP address based on the identity identifier of the terminal, or constructs the message containing the identity identifier of the terminal. In such case, a network device (e.g., the switch) needs to record the identity identifier of the terminal, the MAC address of the terminal, and the corresponding relationship therebetween during or after the authentication on the terminal.

At S1810, after receiving the message, the switch performs inspection control on the message based on the identity identifier of the terminal, the IP address of the terminal, the MAC address of the terminal, and the switch port number of a switch port accessed by the terminal, acquires the identity identifier of the terminal from the received message, and determines, according to the identity identifier of the terminal, the authenticity of the identity of the terminal, whether the terminal passes the network access authentication, whether the port corresponding to the terminal is consistent with the port currently used by the terminal.

In a case where the terminal passes the network access authentication, the switch forwards the message, and the terminal accesses the network through the switch and accesses the network resources.

Figure 19:
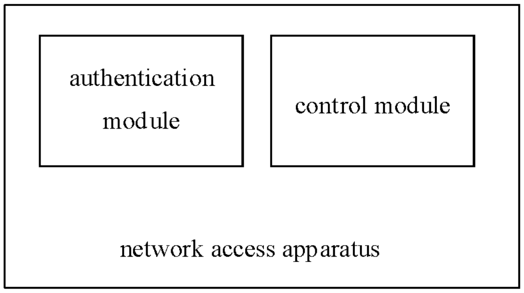
FIG. 19 is a block diagram of a network access apparatus according to an embodiment of the present disclosure.

In a second aspect, referring to FIG. 19, an embodiment of the present disclosure provides a network access apparatus, including an authentication module and a control module.

The authentication module is configured to acquire an identity identifier of a terminal.

The control module is configured to perform inspection control on a message sent by the terminal based on the identity identifier of the terminal.

Figure 20:
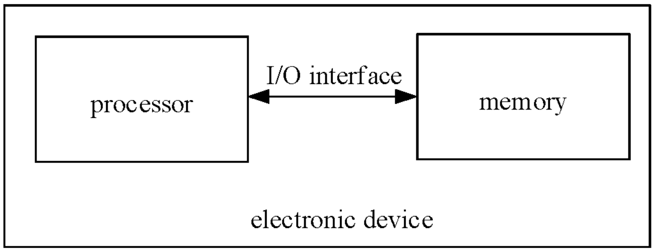
FIG. 20 is a block diagram of an electronic device according to an embodiment of the present disclosure.

In a third aspect, referring to FIG. 20, an embodiment of the present disclosure provides an electronic device, including: at least one processor; a memory having stored thereon at least one computer program which, when executed by the at least one processor, causes the at least one processor to implement the aforesaid network access method; and at least one I/O interface connected between the at least one processor and the memory and configured to enable information interaction between the at least one processor and the memory.

The processor is a device having data processing capability, and includes, but is not limited to, a Central Processing Unit (CPU); the memory is a device having data storage capability, and includes, but is not limited to, a Random Access Memory (RAM, more specifically, a Synchronous Dynamic RAM (SDRAM), a Double Data Rate SDRAM (DDR SDRAM), etc.), a Read-Only Memory (ROM), an Electrically Erasable Programmable Read-Only Memory (EEPROM), and a flash memory (FLASH); and the I/O interface (read/write interface) is connected between the processor and the memory, is configured to enable the information interaction between the processor and the memory, and includes, but is not limited to, a data bus (Bus).

Figure 21:
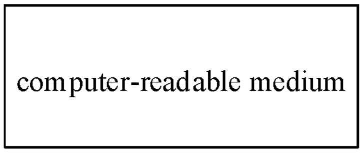
FIG. 21 is a block diagram of a computer-readable storage medium according to an embodiment of the present disclosure.

In a fourth aspect, referring to FIG. 21, an embodiment of the present disclosure provides a computer-readable storage medium having stored thereon a computer program which, when executed by a processor, implements the aforesaid network access method.

A processor is a device having data processing capability, and includes, but is not limited to, a CPU; a memory is a device having data storage capability, and includes, but is not limited to, an RAM (more specifically, an SDRAM, a DDR SDRAM, etc.), an ROM, an EEPROM, and a FLASH; and an I/O interface (read/write interface) is connected between the processor and the memory, is configured to enable information interaction between the processor and the memory, and includes, but is not limited to, a data bus (Bus).

It should be understood by those of ordinary skill in the art that the functional modules/units in all or some of the operations, the systems and the devices disclosed above may be implemented as software, firmware, hardware, or suitable combinations thereof.

If implemented as hardware, the division between the functional modules/units stated above is not necessarily corresponding to the division of physical components; and for example, one physical component may have a plurality of functions, or one function or operation may be performed through cooperation of several physical components.

Some or all of the physical components may be implemented as software executed by a processor, such as a CPU, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, an RAM (more specifically, an SDRAM, a DDR SDRAM, etc.), an ROM, an EEPROM, and a FLASH or other magnetic storage devices; a Compact Disc Read Only Memory (CD-ROM), a Digital Versatile Disc (DVD) or other optical discs; a magnetic cassette, a magnetic tape, a magnetic disk or other magnetic storage devices; and any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. A network access method, comprising:

acquiring an identity identifier of a terminal; and performing inspection control on a message sent by the terminal based on the identity identifier of the terminal, wherein acquiring the identity identifier of the terminal comprises:

performing, in response to an authentication request sent by the terminal, network access authentication on the terminal, wherein the authentication request comprises the identity identifier of the terminal; and storing, in a case where the terminal passes the network access authentication, the identity identifier of the terminal, wherein the method further comprises:

between storing the identity identifier of the terminal and performing inspection control on the message sent by the terminal based on the identity identifier of the terminal, allocating, in response to an address application request sent by the terminal, an Internet Protocol (IP) address to the terminal for the terminal to use the IP address to access a network, and wherein allocating, in response to the address application request sent by the terminal, the IP address to the terminal comprises:

allocating, in response to the address application request sent by the terminal, an original IP address to the terminal; and placing the identity identifier of the terminal in the original IP address to generate a complete IP address, and allocating the complete IP address to the terminal.

2. The method of claim 1, wherein the network access authentication is an access control and authentication protocol (802.1x) authentication.

3. The method of claim 2, wherein performing, in response to the authentication request sent by the terminal, the network access authentication on the terminal comprises:

performing, in response to the authentication request sent by the terminal, Transport Layer Security (TLS) authentication on the terminal according to the identity identifier of the terminal.

4. The method of claim 1, wherein storing, in the case where the terminal passes the network access authentication, the identity identifier of the terminal comprises:

storing, in the case where the terminal passes the network access authentication, the identity identifier of the terminal and a Media Access Control (MAC) address of the terminal; and the address application request comprises the MAC address of the terminal, before placing the identity identifier of the terminal in the original IP address, the method further comprises:

making a query according to the MAC address of the terminal to acquire the identity identifier of the terminal.

5. The method of claim 4, wherein allocating the complete IP address to the terminal comprises:

sending a first message to the terminal, wherein the first message comprises the complete IP address and the MAC address of the terminal; and sending, in response to a second message of the terminal, a confirmation message in a case where the first message is consistent with the second message, wherein the second message comprises the complete IP address and the MAC address of the terminal, and the confirmation message comprises the complete IP address and the MAC address of the terminal.

6. The method of claim 4, wherein making the query according to the MAC address of the terminal to acquire the identity identifier of the terminal comprises:

sending a first message to the terminal, wherein the first message comprises the original IP address and the MAC address of the terminal; and in response to a second message of the terminal, in a case where the first message is consistent with the second message, making the query according to the MAC address of the terminal to acquire the identity identifier of the terminal, wherein the second message comprises the original IP address and the MAC address of the terminal.

7. The method of claim 1, wherein storing, in the case where the terminal passes the network access authentication, the identity identifier of the terminal comprises:

storing, in the case where the terminal passes the network access authentication, the identity identifier of the terminal and a MAC address of the terminal; and the address application request comprises at least one of the MAC address of the terminal or the identity identifier of the terminal, and allocating, in response to the address application request sent by the terminal, the IP address to the terminal comprises:

determining whether the terminal passes the network access authentication according to the MAC address of the terminal or the identity identifier of the terminal; and allocating, in the case where the terminal passes the network access authentication, the IP address to the terminal.

8. The method of claim 1, wherein performing inspection control on the message sent by the terminal based on the identity identifier of the terminal comprises:

acquiring, in response to receiving a data message, the identity identifier of the terminal sending the data message;

checking whether the terminal sending the data message passes the network access authentication according to the identity identifier of the terminal sending the data message; and forwarding, in a case where the terminal sending the data message passes the network access authentication, the data message.

9. An electronic device, comprising:

at least one processor, a memory having stored thereon at least one computer program which, when executed by the at least one processor, causes the at least one processor to implement the network access method of claim 1; and at least one input/output (I/O) interface connected between the at least one processor and the memory and configured to enable information interaction between the at least one processor and the memory.

10. A non-transitory computer-readable storage medium having stored thereon a computer program which, when executed by a processor, implements the network access method of claim 1.

11. The method of claim 1, wherein after allocating the complete IP address to the terminal, the method further comprises:

recording the identity identifier of the terminal, the complete IP address of the terminal, a Media Access Control (MAC) address of the terminal, a switch port number corresponding to the terminal, and corresponding relationships between the identity identifier of the terminal, the complete IP address of the terminal, the MAC address of the terminal, and the switch port number corresponding to the terminal, and wherein performing inspection control on the message sent by the terminal based on the identity identifier of the terminal comprises:

acquiring, in response to receiving a data message, an identity identifier of a terminal sending the data message;

checking whether a terminal sending the data message passes the network access authentication, according to whether an IP address of the terminal sending the data message, a MAC address of the terminal sending the data message and a switch port number accessed by the terminal sending the data message are consistent with the complete IP address, the MAC address, the switch port number and the corresponding relationships that are recorded; and forwarding, in a case where the terminal sending the data message passes the network access authentication, the data message.

12. A network access apparatus, comprising:

an authentication module configured to acquire an identity identifier of a terminal; and a control module configured to perform inspection control on a message sent by the terminal based on the identity identifier of the terminal, wherein the authentication module is further configured to:

perform, in response to an authentication request sent by the terminal, network access authentication on the terminal, wherein the authentication request comprises the identity identifier of the terminal; and store, in a case where the terminal passes the network access authentication, the identity identifier of the terminal, and wherein the authentication module is further configured to:

between storing the identity identifier of the terminal and performing inspection control on the message sent by the terminal based on the identity identifier of the terminal, allocate, in response to an address application request sent by the terminal, an Internet Protocol (IP) address to the terminal for the terminal to use the IP address to access a network, and wherein the authentication module is further configured to:

allocate, in response to the address application request sent by the terminal, an original IP address to the terminal; and place the identity identifier of the terminal in the original IP address to generate a complete IP address, and allocating the complete IP address to the terminal.

* * * * *